US010140749B2

(12) United States Patent
Pollock et al.

(10) Patent No.: US 10,140,749 B2
(45) Date of Patent: Nov. 27, 2018

(54) DATA VISUALIZATION

(71) Applicant: Hewlett Packard Enterprise Development LP, Houston, TX (US)

(72) Inventors: Drew Harmon Pollock, Palo Alto, CA (US); Bernardo Huberman, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/139,868

(22) Filed: Apr. 27, 2016

(65) Prior Publication Data

US 2017/0316596 A1    Nov. 2, 2017

(51) Int. Cl.
| | | |
|---|---|---|
| G09G 5/00 | (2006.01) | |
| G06T 15/00 | (2011.01) | |
| G06T 19/20 | (2011.01) | |
| G06F 3/0481 | (2013.01) | |
| G06F 3/0484 | (2013.01) | |
| H04L 29/08 | (2006.01) | |

(52) U.S. Cl.
CPC ........ *G06T 15/005* (2013.01); *G06F 3/04815* (2013.01); *G06F 3/04842* (2013.01); *G06F 3/04845* (2013.01); *G06T 19/20* (2013.01); *H04L 67/12* (2013.01); *G06T 2200/04* (2013.01); *G06T 2210/36* (2013.01)

(58) Field of Classification Search
CPC ... G06T 15/005; G06T 19/20; G06T 2200/04; G06T 2210/36; G06F 3/04815; G06F 3/04842; G06F 3/04845; H04L 67/12

USPC ....... 345/418, 419, 420, 424, 428, 440, 619, 345/629, 630, 632, 634
See application file for complete search history.

(56) References Cited

U.S. PATENT DOCUMENTS

| | | | | |
|---|---|---|---|---|
| 9,251,472 | B1 * | 2/2016 | Linowes | ................ G08B 19/00 |
| 2009/0062964 | A1 * | 3/2009 | Sullivan | ................. G05B 15/02 |
| | | | | 700/276 |
| 2009/0265656 | A1 * | 10/2009 | Jetha | ..................... G06F 3/0481 |
| | | | | 715/781 |
| 2012/0296610 | A1 * | 11/2012 | Hailemariam | .......... G06T 19/00 |
| | | | | 703/1 |
| 2013/0144546 | A1 * | 6/2013 | Brackney | ............ G06F 17/5004 |
| | | | | 702/61 |
| 2013/0321458 | A1 | 12/2013 | Miserendino et al. | |

(Continued)

OTHER PUBLICATIONS

Goovaerts, P., "Three-dimensional Visualization, Interactive Analysis and Contextual Mapping of Space-time Cancer Data", (Research Paper), 2010, 10 Pages.

(Continued)

*Primary Examiner* — Xiao Wu
*Assistant Examiner* — Sarah Lhymn
(74) *Attorney, Agent, or Firm* — Brooks, Cameron & Huebsch, PLLC

(57) ABSTRACT

In one example, a system for a data visualization includes a generation engine to link data to corresponding objects within a three-dimensional (3-D) visualization of an area, a level engine to display the corresponding objects at a selected level of detail, a data engine to alter a setting of the corresponding objects upon a selection of the corresponding objects, and a simulation engine to generate a simulation of the corresponding objects within the area based on the altered setting.

12 Claims, 6 Drawing Sheets

(56) References Cited

U.S. PATENT DOCUMENTS

2013/0339080 A1* 12/2013 Beaulieu ............... G06Q 10/00
                                                        705/7.25
2014/0258817 A1   9/2014 Carrier et al.
2014/0331179 A1  11/2014 Tullis et al.

OTHER PUBLICATIONS

Ho E. et al., "Interactive Three-dimensional Visualization and Contextual Analysis of Protein Interaction Networks", (Research Paper), Nov. 20, 2007, 2 Pages.

Itoh, T. et al., "Visualization of Corpus Data by a Dual Hierarchical Data Visualization Technique", (Research Paper), Nov. 18, 2008, 8 Pages.

* cited by examiner

DATA VISUALIZATION

BACKGROUND

Data sets corresponding to sensor data can include a relatively large quantity of data. Sensors are becoming less expensive and thus more accessible for large scale application. The data sets can include historical data and current data collected from a plurality of sensors. The plurality of sensors can each correspond to a particular device and/or particular area. For example, the plurality of sensors can be utilized to monitor a heating, ventilation, and air conditioning (HVAC) unit.

DETAILED DESCRIPTION

The present application relates to systems, devices, and computer readable medium for data visualization. In one example, a system for data visualization includes a generation engine to link data to corresponding objects within a three-dimensional (3-D) visualization of an area, a level engine to display the corresponding objects at a selected level of detail, a data engine to alter a setting of the corresponding objects upon a selection of the corresponding objects, and a simulation engine to generate a simulation of the corresponding objects within the area based on the altered setting.

The data visualization described herein can be utilized to organize and visually represent data. As used herein, a data visualization can include a visual representation of objects with embedded data that corresponds to the objects. In some examples, the data can include visual representations of buildings, surrounding landscape, and/or objects within the buildings of a particular area. For example, the visual representations can be generated based on structural data that can include three dimensional (3-D) CAD models of buildings and/or objects within a building. In some examples, the data can include sensor data that is received from a plurality of sensors. In some examples, the data from the plurality of sensors can correspond to the visual representations generated based on the structural data. For example, the visual representations can include visual representations of an HVAC system for a building or structure. In this example, the data from the plurality of sensors can correspond to a number of different areas of the HVAC system and/or a number of different devices of the HVAC system.

In some examples, the visual representations can be linked with the sensor data to generate a 3-D visual representation of a plurality of detail layers of the building with corresponding sensor data embedded within the 3-D visualization (e.g., visual representation, etc.). In some examples, a user can navigate through the 3-D visualization of the building and select objects within the 3-D visualization to access data that corresponds to the selected object. In some examples, the 3-D visualization of physical objects and corresponding sensor data can be utilized to compare sensor data within a particular area of a building. In these examples the sensor data can be compared since the physical objects have a relationship of being within the particular area of the building. Comparing sensor data utilizing the 3-D visualization can be utilized to identify sensor data to be compared based on a physical relationship (e.g., spatial relationship, etc.) between data from a number of sensors and/or a number of objects within the building.

Figure 1:
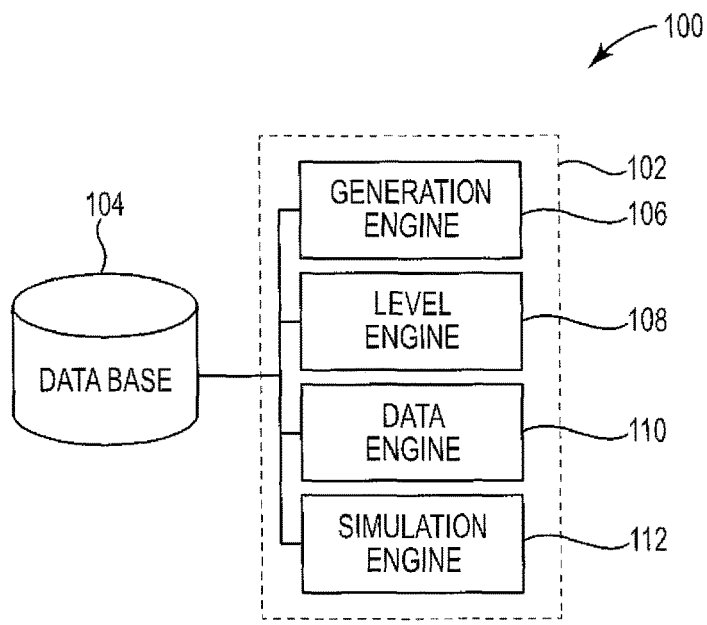
FIG. 1 illustrates a diagram of an example of a system for data visualization according to the present disclosure.

FIG. 1 illustrates a diagram of an example of a system 100 for data visualization according to the present disclosure. The system 100 can include a database 104, a data visualization manager 102, and/or a number of engines (e.g., generation engine 106, level engine 108, data engine 110, simulation engine 112). The data visualization manager 102 can be in communication with the database 104 via a communication link, and can include the number of engines (e.g., generation engine 106, level engine 108, data engine 110, simulation engine 112). The data visualization manager 102 can include additional or fewer engines than are illustrated to perform the various functions as will be described in further detail.

The number of engines (e.g., generation engine 106, level engine 108, data engine 110, simulation engine 112) can include a combination of hardware and programming, but at least hardware, to perform functions described herein (e.g., link data to corresponding objects within a three-dimensional (3-D) visualization of an area, display the corresponding objects at a selected level of detail, alter a setting of the corresponding objects upon a selection of the corresponding objects, generate a simulation of the corresponding objects within the area based on the altered setting, etc.) as well as hard-wired programs (e.g., logic).

The generation engine 106 can include hardware and/or a combination of hardware and programming, but at least hardware, to link data to corresponding objects within a three-dimensional (3-D) visualization of an area. As used herein, the 3-D visualization can include a 3-D representation of the area that can be navigated as described herein. In some examples, the 3-D visualization can be generated by the generation engine 106 based on models and/or spatial relationship data corresponding to the area. For example, the 3-D visualization can be generated based on CAD models and spatial relationships of objects and/or buildings in the area. In some examples, the generation engine 106 can generate spatial relationships for a plurality of objects within the area to generate a 3-D visualization of the plurality of objects.

In some examples, the generation engine 106 can link sensor data to corresponding objects of the 3-D visualization. For example, there can be sensor data corresponding to an air chiller of a HVAC system that can be linked to a 3-D visualization of the air chiller. In some examples, the linked sensor data can be accessed and/or displayed upon selection of the object of the 3-D visualization. For example, the sensor data corresponding to the air chiller of the HVAC system can be selected and the sensor data corresponding to the air chiller can be displayed. In some examples, multiple objects and/or devices can be selected from the 3-D visualization and the corresponding data from the multiple objects can be displayed and/or compared.

The level engine 108 can include hardware and/or a combination of hardware and programming, but at least hardware, to display the corresponding objects at a selected level of detail. In some examples, the level engine 108 can be utilized to display the area of the 3-D visualization at a particular level of detail. As used herein, the level of detail can represent a zoom level of the 3-D visualization. For example, a first level of detail can include a display of multiple buildings. In this example, a second level of detail a display of a room within one of the multiple buildings. In this example, the first level of detail can include embedded data corresponding to the multiple buildings and the second level can include embedded data corresponding to objects within the room.

The data engine 110 can include hardware and/or a combination of hardware and programming, but at least hardware, to alter a setting of the corresponding objects upon a selection of the corresponding objects. In some examples, selecting an object within the 3-D visualization can display data corresponding to the object. In some examples, selecting the object within the 3-D visualization can display a number of settings. For example, the number of settings can correspond to settings of a mechanical device or electrical device. In some examples, the number of settings can alter a functionality of a mechanical or electrical device. For example, the number of settings can activate or deactivate a water heater or chiller of a HVAC system. In another example, the number of settings can alter a performance (e.g., increase a performance, decrease a performance, increase a fan speed, decrease a fan speed, etc.) of a water heater or chiller of a HVAC system. In some examples, the number of settings can correspond to settings of the physical mechanical device or physical electrical device.

The simulation engine 112 can include hardware and/or a combination of hardware and programming, but at least hardware, to generate a simulation of the corresponding objects within the area based on the altered setting. In some examples, the simulation of the corresponding objects can simulate a scenario when the corresponding objects are utilized with the altered settings. For example, the simulation can be a visual display within the 3-D visualization of the corresponding objects performing functions based on the settings. In some examples, the visual display of the simulation can include objects or actions that may not be visualized at the physical objects. For example, the visual display of the simulation for an air chiller can include a visual representation of cool air dispensing from an air diffuser of an HVAC system. In this example, the cool air dispensing from the air diffuser of the physical HVAC system may not be visualized by a user. That is, in some examples, the simulation engine 112 can display a visual 3-D visualization of the performance of the corresponding objects.

In some examples, the simulation engine 112 can generate data (e.g., performance data, etc.) corresponding to the simulation based on the altered settings. For example, the simulation engine 112 can generate temperature data for an area based on the settings provided to the HVAC system of the 3-D visualization. In some examples, the generated data based on the altered settings can be compared to real data collected by the number of sensors. For example the historical temperature data collected by sensors for an area can be compared to the simulation data generated with the altered settings to determine an efficiency of the altered settings. In some examples, the simulation engine 112 can generate performance data that can represent a predicted performance over a period of time for the corresponding objects based on the altered setting.

In some examples, the simulation engine 112 can be utilized to predict performance of a system. For example, current settings for a HVAC system can be utilized to predict how the HVAC system will perform based on predicted variables (e.g., quantity of people within the building, weather, etc.). In some examples, the simulation can be utilized to alter settings of the physical devices for a future time.

Figure 2:
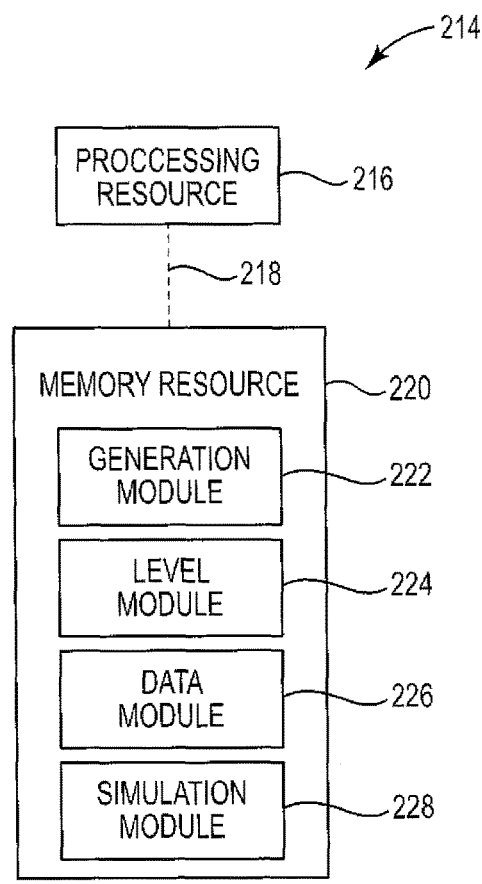
FIG. 2 illustrates a diagram of an example of a computing device according to the present disclosure.

FIG. 2 illustrates a diagram of an example of a computing device 214 according to the present disclosure. The computing device 214 can utilize software, hardware, firmware, and/or logic to perform functions described herein.

The computing device 214 can be any combination of hardware and program instructions to share information. The hardware, for example, can include a processing resource 216 and/or a memory resource 220 (e.g., non-transitory computer-readable medium (CRM), machine readable medium (MRM), database, etc.). A processing resource 216, as used herein, can include any number of processors capable of executing instructions stored by a memory resource 220. Processing resource 216 can be implemented in a single device or distributed across multiple devices. The program instructions (e.g., computer readable instructions (CRI)) can include instructions stored on the memory resource 220 and executable by the processing resource 216 to implement a desired function (e.g., generate a three dimensional (3-D) visualization of an area with a plurality of objects, link data with corresponding objects of the plurality of objects, wherein the data represents a performance of the corresponding objects over time, alter a setting of the corresponding objects, wherein the setting alters a performance of the corresponding objects, simulate a performance of the corresponding objects based on the altered setting, etc.).

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules (e.g., generation module 222, level module 224, data module 226, simulation module 228, etc.) can include CRI that when executed by the processing resource 216 can perform functions. The number of modules (e.g., generation module 222, level module 224, data module 226, simulation module 228, etc.) can be sub-modules of other modules. For example, the generation module 222 and the level module 224 can be sub-modules and/or contained within the same device. In another example, the number of modules (e.g., generation module 222, level module 224, data module 226, simulation module 228, etc.) can comprise individual modules at separate and distinct locations (e.g., CRM, etc.).

Each of the number of modules (e.g., generation module 222, level module 224, data module 226, simulation module 228, etc.) can include instructions that when executed by the processing resource 216 can function as a corresponding engine as described herein. For example, the generation module 222, level module 224, and data module 226 can include instructions that when executed by the processing resource 216 can function as the generation engine 106, the level engine 108, and the data engine 110, respectively.

Figure 3:
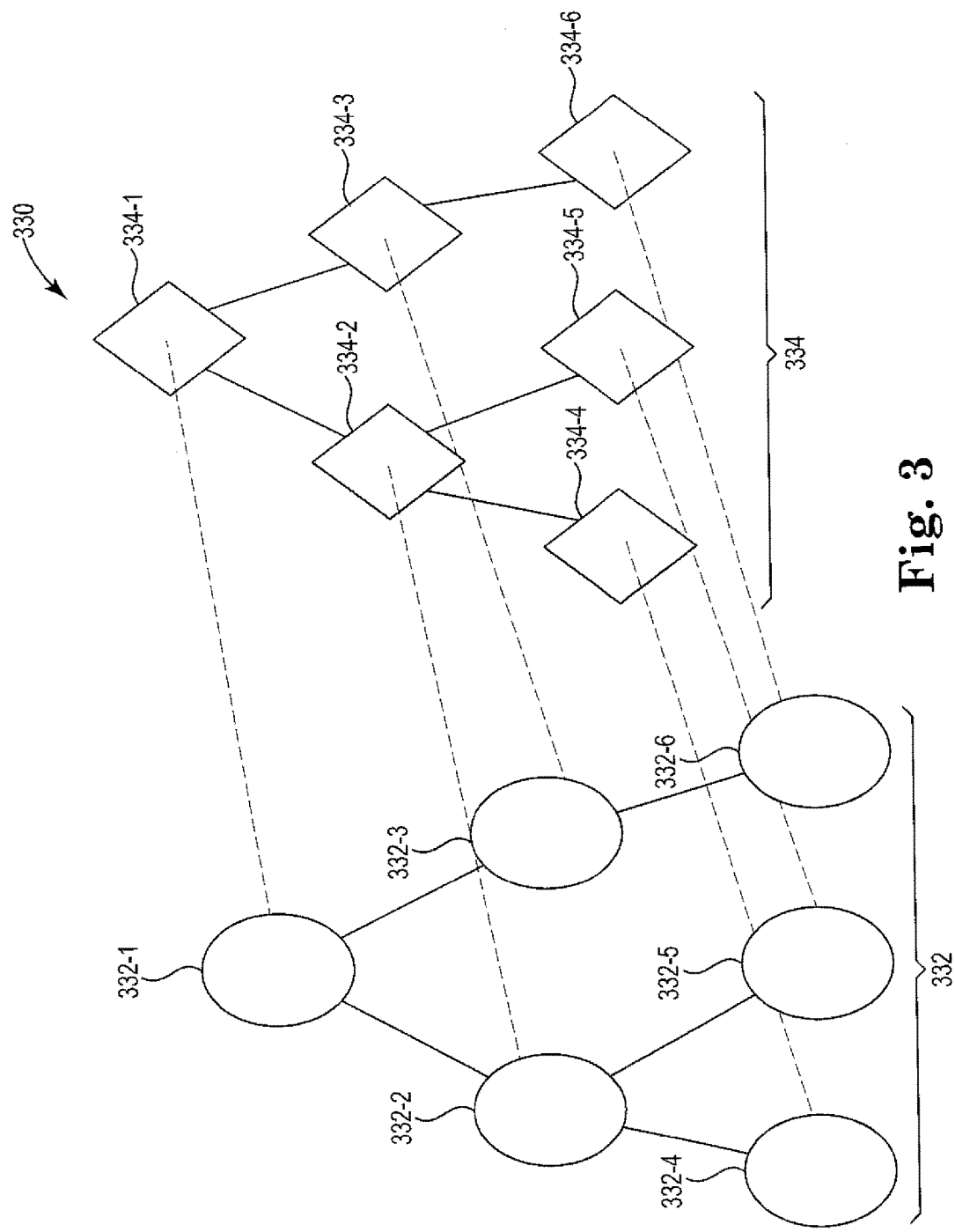
FIG. 3 illustrates a diagram of an example of link hierarchies for data visualization according to the present disclosure.

FIG. 3 illustrates a diagram of an example of link hierarchies 330 for data visualization according to the present disclosure. In some examples, the link hierarchies 330 can be a visual representation of linking data to a number of 3-D objects of a 3-D visualization. In some examples, the link hierarchies 330 can include a data tree 332 that represents data at a number of levels. In some examples, the link hierarchies 330 can include an object tree 334 that represents 3-D objects at a number of levels.

As described herein, the number of levels can include a level of detail and/or a portion of objects within an area. For example, the level 332-1 of data tree 332 can represent data for an overall area. In another example, the level 332-1 of data tree 332 can represent data for a plurality of buildings within the area at level 334-1 of the object tree 334. In some examples, each of the plurality of buildings from level 334-1 can be selected to display the data of level 332-1 and/or a number of settings corresponding to the data at level 332-1. That is, the data of level 332-1 can be linked to the objects within level 334-1.

In some examples, the data at level 332-1 can be linked to data at level 332-2 and data at level 332-3. For example, the data at level 332-1 can include data for an HVAC system for a building. In this example, the data at level 332-2 can be data for an HVAC system in a first room of the building and the data at level 332-3 can be data for the HVAC system in a second room of the building. In this example, the objects at level 334-1 can include a 3-D visualization of the building, the objects at level 334-2 can include a 3-D visualization of the first room, and the objects at level 334-3 can include a 3-D visualization of the second room.

In some examples, the data at level 332-2 can be linked to data at level 332-4 and/or data at level 332-5. In some examples, the data at level 332-2 can correspond to a particular room within a building and the data at level 332-4 can correspond to a first object within the room and the data at level 332-5 can correspond to a second object within the room. For example, the data at level 332-2 can correspond to sensor data received from sensors within a particular room of a building. In this example, the data at level 332-2 can be linked to data at level 332-4 that corresponds to data received from a sensor coupled to a HVAC water heater. In this example, the data at level 332-4 can be linked to a 3-D visualization of the HVAC water heater at level 334-4 of the object tree 334. In this example, the data at level 332-5 can correspond to data received from a sensor coupled to a HVAC water chiller. In this example, the data at level 332-5 can be linked to a 3-D visualization of the HVAC water chiller at level 334-5 of the object tree.

In some examples, the data at level 332-3 can be linked to data at level 332-6. In some examples, the data at level 332-6 can include a number of settings. In some examples, the number of settings at level 332-6 can be linked to a particular electrical or mechanical device at level 334-6 of the object tree 334. As described herein, the data at level 332-6 can be displayed when the object at level 334-6 is selected within the 3-D visualization generated. For example, the electrical or mechanical device at level 334-6 can be a thermostat and the data at level 332-6 can be a number of thermostat settings. In this example, the number of thermostat settings can be altered upon selection of the 3-D visualization of the thermostat.

In some examples, altering a setting of a mechanical or electrical device can alter a setting of a corresponding physical device. For example, altering a setting of a thermostat within the 3-D visualization can alter the setting of the physical thermostat corresponding to the 3-D visualization of the thermostat.

In some examples, altering a setting of a mechanical or electrical device can be utilized to simulate how the altered setting changes will affect the area. For example, a setting of a thermostat can be altered to a lower temperature and a simulation can be generated for the area based on a lower temperature setting. In some examples, the simulation can include data over a period of time and/or a visual simulation of the setting changes. For example, the simulation can include data of projected temperature readings, projected efficiency data, and/or projected system performance for a period of time. In some examples, the data can include simulated data of previous days utilizing previous data collected from other areas. For example, the data can include simulated data from a previous month utilizing actual data collected by sensors (e.g., exterior temperature, interior temperature of other areas, power usage, etc.) with the altered setting of the electrical or mechanical device.

In some examples, the simulation can include a visual representation (e.g., visualization) of the altered setting. For example, the altered setting can include an activation of a water chiller of an HVAC system. In this example, the simulation can include a visual representation of "cool" air dispensing from an air diffuser of the HVAC system. This can give a visual representation of the setting change of a physical system that can be utilized in a plurality of different areas.

Figure 4:
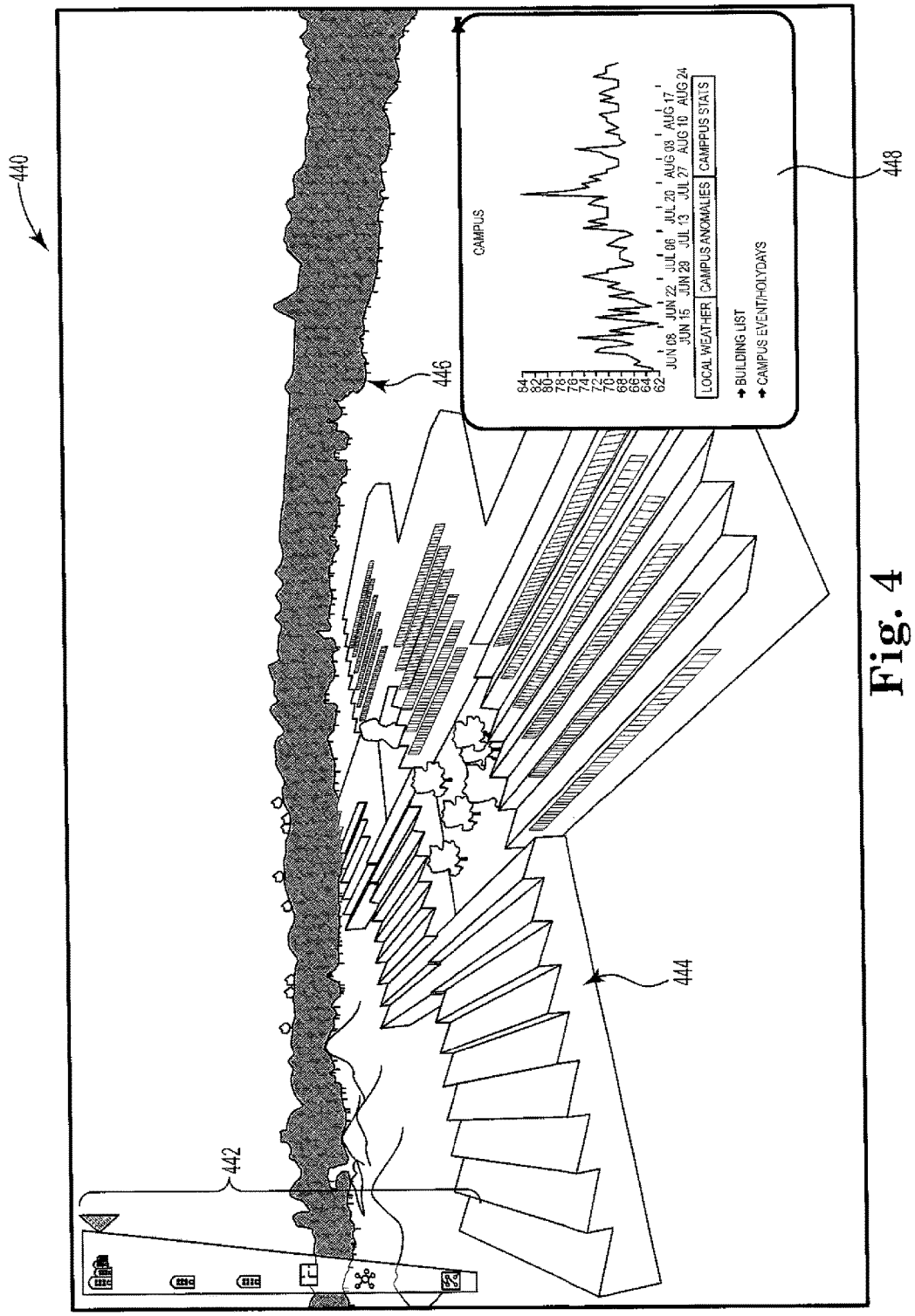
FIG. 4 illustrates a diagram of an example of a user interface for data visualization according to the present disclosure.

FIG. 4 illustrates a diagram of an example of a user interface 440 for data visualization according to the present disclosure. In some examples, the user interface 440 can be displayed on a user interface of a computing device. In some examples, the user interface 440 can be utilized to navigate through a 3-D visualization of an area. In some examples, the user interface 440 can be a representation of a campus or building. For example, the user interface 440 can display a 3-D visualization of a building 444 and surrounding landscape 446 (e.g., trees, mountains, etc.).

In some examples, the user interface 440 can be utilized to navigate the 3-D visualization of the exterior of the building 444 and/or surrounding landscape 446. In some examples, the user interface 440 can enable a user to focus on objects of interest of the 3-D visualization. For example, the user interface 440 can zoom in on specific objects of the 3-D visualization. In some examples, the user interface 440 can be utilized to display spatial relationships between objects of the 3-D visualization. For examples, the user interface 440 can display how spatially close a building 444 is to other objects within the 3-D visualization.

In some examples, the user interface 440 can include a navigation tool 442. In some examples, the navigation tool 442 can be utilized to select a particular level of the 3-D visualization. As described herein, the 3-D visualization can be generated with a plurality of levels that can each include a portion of the area. For example, the user interface 440 can be at a first level when it is displaying the building 444 and surrounding landscape 446. In this example, the user interface can be at a second level when it is displaying a room within the building 444. In some examples, each level can be selected utilizing the navigation tool 442. In some examples, each level can include embedded data that corresponds to objects within the particular level. For example, the level displayed at the user interface 440 can include exterior temperature surrounding the building 444.

In some examples, the data corresponding to the building 444 can be displayed as graphical representation 448. In some examples, the data corresponding to the building 444 can be displayed when the level is selected at the navigation tool 442. In some examples, the data corresponding to the building 444 can be displayed upon selection of the building. For example, the data represented in the graphical representation 448 can be displayed when the building 444 is selected. In some examples, the graphical representation 448 can include options to display other data corresponding to the area displayed at a particular level. For example, the graphical representation 448 can include options to display building names, campus events, campus holidays, local weather for the campus, campus anomalies, and/or other campus stats.

As described herein, the navigation tool 442 can be utilized to select a different level of detail for the area displayed on the user interface 440. In some examples, the navigation tool 442 can be utilized to select a particular room within the building 444. In some examples, the navigation tool 442 can be utilized to display particular systems within the building 444. For example, the navigation tool 442 can be utilized to display electrical systems, HVAC systems, water systems, networking systems, and/or other systems utilized by the building 444.

Figure 5:
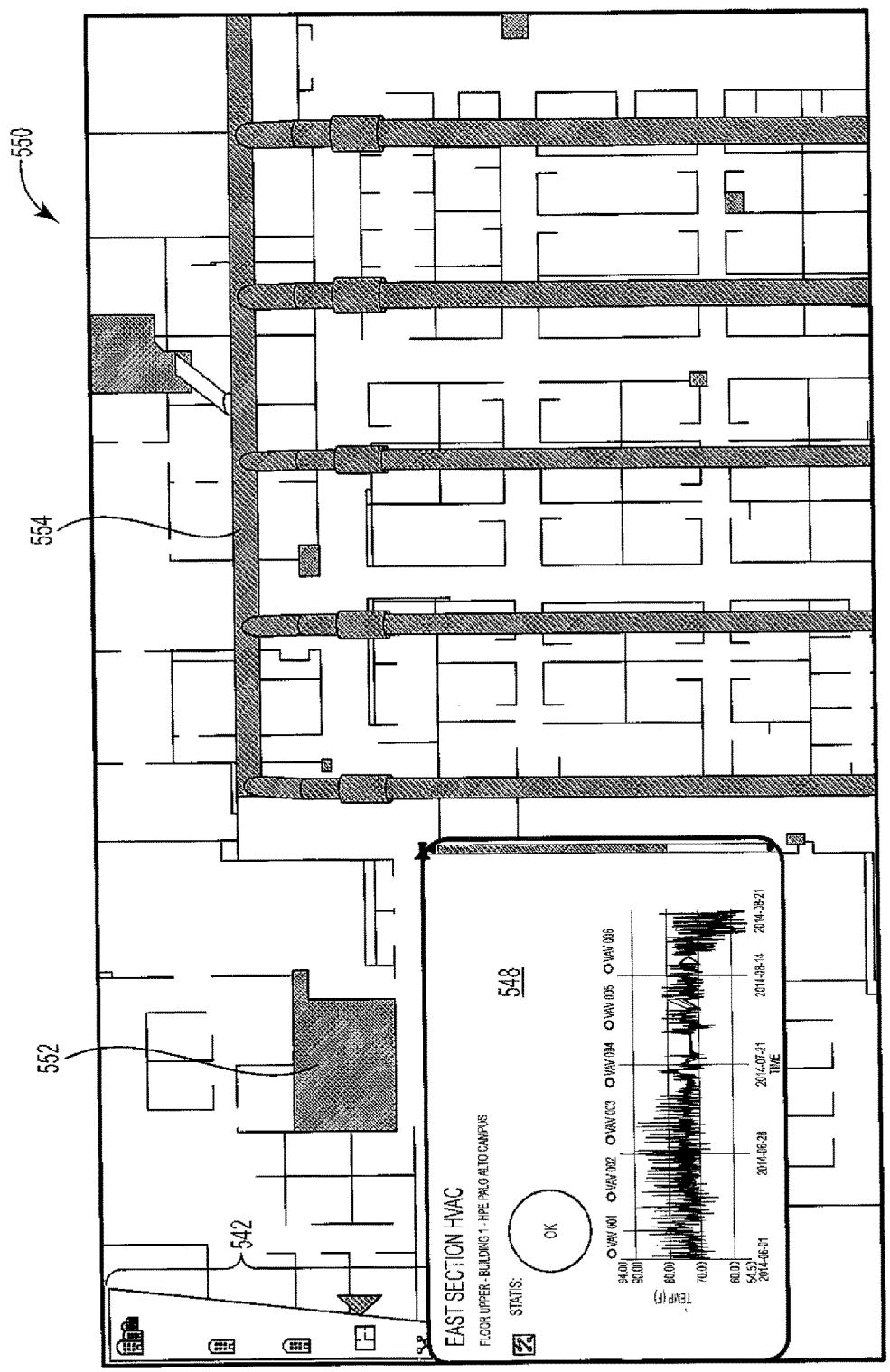
FIG. 5 illustrates a diagram of an example of a user interface for data visualization according to the present disclosure.

FIG. 5 illustrates a diagram of an example of a user interface 550 for data visualization according to the present disclosure. In some examples, the user interface 550 can be selected level of the navigation tool 542. In some examples, the level displayed via the user interface 550 can be a relatively more detailed level compared to the level displayed via the user interface 440 as referenced in FIG. 4. In some examples, the user interface 550 can include a plurality of objects within a room of a building (e.g., building 444 as referenced in FIG. 4, etc.).

In some examples, the user interface 550 can include a navigation tool 542. As described herein, the navigation tool 542 can be utilized to navigate through the 3-D visualization of an area. In some examples, the navigation tool 542 can be utilized to zoom in and zoom out to display a specific portion of the area. In some examples, the navigation tool 542 can be utilized to select and display particular objects and/or systems within the area. For example, the navigation tool 542 can be utilized to select a portion of an HVAC system (e.g., East Section HVAC, etc.). In this example, the portion of the HVAC system can be displayed on the user interface 550. In some examples, the portion of the HVAC system can include an air handling unit (AHU) 552, a number of ducts 554, a number of variable air volume (VAV) units, and/or a number of diffusers within an area.

In some examples, individual objects from the portion of the HVAC system can be selected to display data corresponding to the selected object. For example, an AHU 552 can be selected and data corresponding to the AHU 552 can be displayed. In some examples, a VAV unit can be selected to display sensor data corresponding to the VAV unit. In some examples, displayed data can be displayed with a graphical representation 548. In some examples, the graphical representation 548 can display data corresponding to a plurality of objects within a system that is displayed on the user interface 550. For example, the user interface 550 can display a plurality of VAV units (e.g., VAV 001, VAV 002, VAV 003, etc.). In this example, data corresponding to the plurality of VAV units can be displayed on the graphical representation 548. In this example, the data corresponding to the plurality of VAV units can include temperature data monitored by sensors at each of the plurality of VAV units. In this example, the data can be represented over a period of time.

In some examples, the graphical representation 548 can include a status indicator that can represent a real time status of the portion of the system displayed on the user interface 550. In some examples, the status can indicate a failure of the portion of the system when the data presented by the graphical representation 548 is outside a threshold value. For example, the status indicator can display "OK" when the temperature values of the plurality of VAV units are within a threshold temperature over a particular time period. In another example, the status indicator can display "Failure" when a temperature value of one of the plurality of VAV units is outside a temperature range or temperature threshold over the particular time period.

Figure 6:
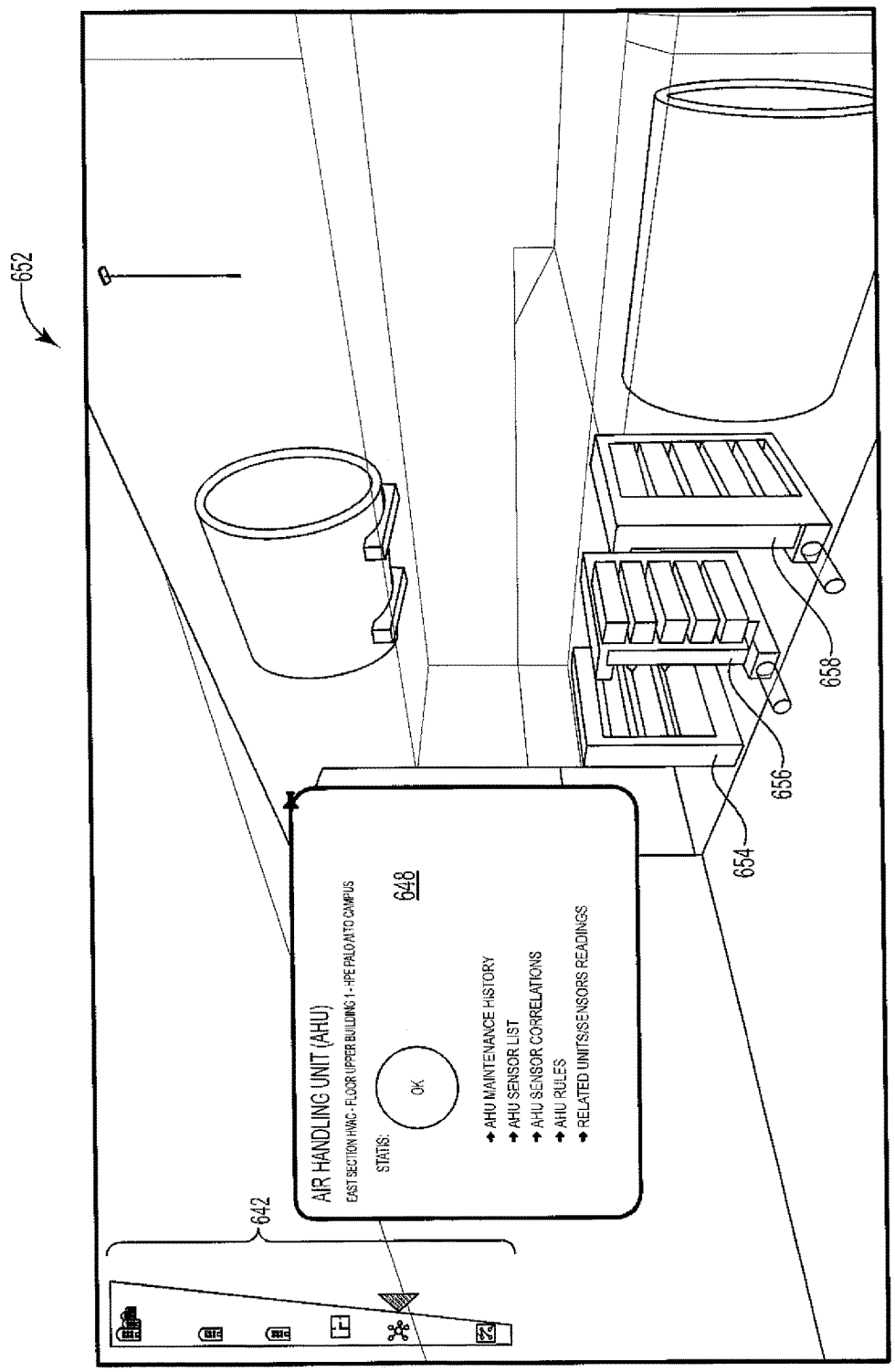
FIG. 6 illustrates a diagram of an example of a user interface for data visualization according to the present disclosure.

FIG. 6 illustrates a diagram of an example of a user interface 652 for data visualization according to the present disclosure. In some examples, the user interface 652 can be a 3-D visualization of the AHU 552 as referenced in FIG. 5. In some examples, the navigation tool 642 can be utilized to select a level that includes the electrical and mechanical objects associated with the AHU 552 as referenced in FIG. 5. For example, an AHU can include a filter 654, a water heating unit 656, and/or a water chiller unit 658.

In some examples, the user interface 652 can include a navigation tool 642 to navigate through the 3-D visualization. As described herein, the navigation tool 642 can be utilized to select a particular level, a particular system, and/or a particular device or object within the 3-D visualization. For example, a user can select the AHU 552 as referenced in FIG. 5 and utilize the navigation tool 642 to display the user interface 652.

In some examples, the AHU unit displayed in user interface 652 can include data corresponding to the AHU unit. In some examples, the data can include data corresponding to the filter 654, the water heating unit 656, and/or the water chiller unit 658. For example, the data can include a maintenance history of the AHU, a sensor list for the AHU, a number of settings for the AHU, and/or sensor data corresponding to the AHU.

In some examples, the data corresponding to the AHU can be displayed at a graphical representation 648. In some examples, the graphical representation 648 can include a number of selectable lists to display particular data corresponding to the AHU. In some examples, the selectable lists can be utilized to select particular sensor data over a selected period of time.

In some examples, the 3-D visualization can be utilized to determine objects and/or devices that are spatially relevant to other objects and/or devices. For example, a user can determine that the water heating unit 656 and the water chiller unit 658 correspond to the same AHU. In this example, data from the water heating unit 656 can be compared to data from the water chiller unit 658. For example, comparing the data from the water heating unit 656 and water chiller unit 658 can include comparing sensor data relating to the utilization of the water heating unit 656 and water chiller unit 658. It can be advantageous to determine the spatial relationships between objects to better understand the data comparison between the water heating unit 656 and water chiller unit 658. In some examples, the performance data of the water heating unit 656 and the water chiller unit 658 can be combined.

In some examples, the selectable lists can include a number of settings that can be altered for the AHU. As described herein, a number of settings can be altered for electrical or mechanical devices represented by the user interface 652. In some examples, the altered settings within the user interface 652 can alter settings of the corresponding physical devices. For example, a setting of the water chiller unit 658 can be altered to a lower temperature. In this example, the same or similar setting of the physical water chiller unit corresponding to the displayed water chiller unit 658 can be changed to reflect the same setting change.

In some examples, the altered settings within the user interface 652 can be utilized to generate a simulation of the area with the altered settings. In some examples, the simulation can include a generation of simulated data and/or a visual simulation of the altered settings. For example, a setting of the water chiller unit 658 can be altered to a lower temperature. In this example, simulated data of the altered setting change can be generated. In some examples, historical data of the area can be utilized to predict or generate the simulated data. In some examples, the historical data can include weather data and/or sensor data for other areas of the building. In some examples, the visual simulation of the setting change can be displayed at diffusers that are coupled to the water chiller unit 658. For example, a color coded representation of air from the diffusers can be displayed to represent cooler air being dispensed from the diffusers.

Figure 7:
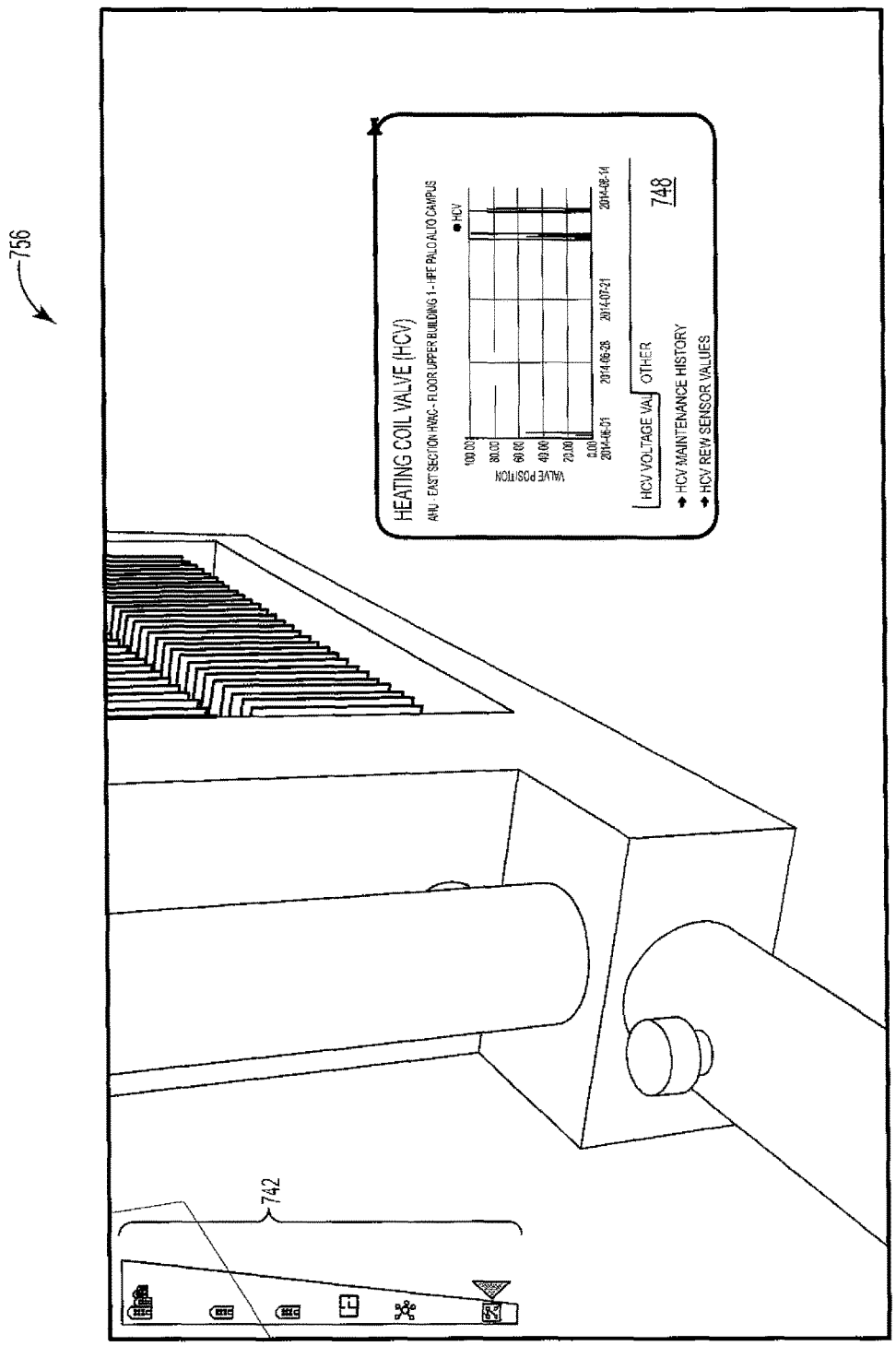
FIG. 7 illustrates a diagram of an example of a user interface for data visualization according to the present disclosure.

FIG. 7 illustrates a diagram of an example of a user interface 756 for data visualization according to the present disclosure. In some examples, the user interface 756 can include a navigation tool 742 that is similar or the same as described herein. For example, the navigation tool 742 can be utilized to select or zoom into a water heating unit (e.g., water heating unit 656 as referenced in FIG. 6, etc.). In this example, the user interface 756 can display a heating coil valve (HCV) of the water heating unit via the navigation tool 742.

In some examples, the user interface 756 can be utilized to select a particular HCV of a particular water heating unit within the 3-D visualization as described herein. In some examples, the HCV can be selected to display data as described herein. In some examples, the data can be displayed as a graphical representation 748. In some examples, the graphical representation 748 for the HCV can include a valve position over a period of time. For example, the graphical representation 748 can display a value for percent open over a time period of a week. In this example, the graphical representation 748 can also include maintenance history for the HCV and/or raw sensor data for the HCV.

In some examples, the user interface 756 can be utilized to alter a number of settings for the HCV as described herein. In some examples, the number of settings can include the valve position of the HCV. In some examples, the setting of the valve position can be altered via the user interface 756 for a number of different time periods. For example, the setting of the valve position can be changed for a plurality of different days from a previous week. In this example, a simulation can be generated for each of the plurality of different days from the previous week to generate data and/or a visual representation of the altered valve position.

In some examples, the simulation can be generated based on the altered valve position and historical data that can affect the area. For example, the altered valve position will allow a different quantity of water to enter the water heating unit, which will alter a temperature of air supplied to a plurality of diffusers within the area. In another example, the historical data can include an exterior temperature at a particular time, a quantity of people within the area or building at the particular time, a thermal efficiency of the building, among other factors that can affect a temperature within the area or building.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The figures herein follow a numbering convention in which the first digit or digits correspond to the drawing figure number and the remaining digits identify an element or component in the drawing. As will be appreciated, elements shown in the various examples herein can be added, exchanged, and/or eliminated so as to provide a number of additional examples of the present disclosure. In addition, as will be appreciated, the proportion and the relative scale of the elements provided in the figures are intended to illustrate certain examples of the present disclosure, and should not be taken in a limiting sense.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A wireless controller for data visualization, comprising:
   a processing resource; and
   a memory resource storing machine readable instructions to cause the processing resource to:
   link actual data from sensors of physical objects to corresponding objects within a three-dimensional (3-D) visualization of an area displayed on a user interface including a navigation tool, wherein the navigation tool comprises:
      a plurality of different selectable graphical icons, wherein each selectable graphical icon represents the 3-D visualization at a different level of detail, each different level of detail corresponds to at least a portion of the area being 3-D visualized, and each different level of detail comprises embedded data corresponding to the linked physical objects at said different level of detail;
   enable selection of a particular portion of the area being 3-D visualized using the different selectable graphical icons on the navigation tool;
   display the particular portion of the area being 3-D visualized on the user interface at the level of detail corresponding to the selectable graphical icons on the navigation tool;
   alter a functionality setting of one of the corresponding objects within the displayed portion of the area being 3-D visualized;
   generate a simulation utilizing the altered functionality setting; and
   update the 3-D visual representation by modifying the plurality of different selectable graphical icons on the navigation tool, wherein the modification corresponds to results of the simulation of the corresponding objects executing the altered functionality setting within the displayed portion of the area.

2. The wireless controller of claim 1, wherein the corresponding objects include physical objects located within the area, and wherein altering the functionality setting of the corresponding objects physically alters the performance of the physical objects.

3. The wireless controller of claim 1, comprising instructions to generate performance data of the corresponding objects based on the altered functionality setting.

4. The wireless controller of claim 1, comprising instructions to display a portion of the corresponding objects based on the level of detail corresponding to the selectable graphical icons on the navigation tool.

5. A non-transitory computer readable medium storing instructions executable by a processing resource to cause a computer to:
   generate a three dimensional (3-D) visual representation of an area with a plurality of objects displayed on a user interface including a navigation tool, wherein the navigation tool comprises:
      a plurality of different selectable graphical icons, wherein each selectable graphical icon represents the 3-D visual representation at a different level of detail, each different level of detail corresponds to at least a portion of the area being 3-D visualized, and
   link actual data from sensors of physical objects with corresponding objects of the plurality of objects, wherein the actual data represents a performance of the corresponding objects over time, each different level of detail comprises embedded data corresponding to the linked physical objects at said different level of detail;
   enable selection of a particular portion of the area being 3-D visualized using the different selectable graphical icons on the navigation tool;
   display the particular portion of the area being 3-D visualized on the user interface at the level of detail corresponding to the selectable graphical icon on the navigation tool;
   alter a functionality setting of one of the corresponding objects within the displayed portion of the area being 3-D visualized;
   generate a simulation utilizing the altered functionality setting; and
   update the 3-D visual representation by, modifying the plurality of different selectable graphical icons on the navigation tool, wherein the modification corresponds to results of the simulation of the corresponding objects executing the altered functionality setting within the displayed portion of the area.

6. The non-transitory computer readable medium of claim 5, comprising instructions to generate performance data of the corresponding objects based on the performance simulation based on the altered functionality settings.

7. The non-transitory computer readable medium of claim 5, comprising instructions to receive a selection of an object of the corresponding objects.

8. The non-transitory computer readable medium of claim 7, comprising instructions to display on the user interface an effect of the altered functionality setting on different objects of the plurality of objects within the area.

9. The non-transitory computer readable medium of claim 5, comprising instructions to generate spatial relationships for the plurality of objects within the area to generate the 3-D visual representation of the plurality of objects including the spatial relationships.

10. A non-transitory computer readable medium storing instructions executable by a processing resource to cause a computer to:
    generate a three-dimensional (3-D) visual representation of a building, within an area with a plurality of objects corresponding to a plurality of physical objects and a plurality of sensors to collect performance data of the plurality of physical objects;
    link actual data from the plurality of sensors of physical objects with corresponding objects of the plurality of objects;
    receive a selection of an object from the plurality of objects displayed on a user interface including a navigation tool, wherein the navigation tool comprises:
       a plurality of different selectable graphical icons, wherein each selectable graphical icon represents the 3-D visual representation at a different level of detail, each different level of detail corresponds to a portion of the area being 3-D visualized, and each different level of detail comprises embedded data corresponding to the linked physical objects at said different level of detail;
    enable selection of a particular portion of the area being 3-D visualized using the different selectable graphical icons on the navigation tool;
    display the particular portion of the area being 3-D visualized on the user interface at the level of detail corresponding to the selectable graphical icons on the navigation tool;
    alter a functionality setting of one of the corresponding objects within the displayed portion of the area being 3-D visualized;
    generate a simulation utilizing the altered functionality setting; and
    update the 3-D visual representation by, modifying the plurality of different selectable graphical icons on the navigation tool, wherein the modification corresponds to results of the simulation of the corresponding objects executing the altered functionality setting within the displayed portion of the area.

11. The non-transitory computer readable medium of claim 10, comprising instructions to alter the 3-D visual representation of the object.

12. The non-transitory computer readable medium of claim 10, comprising instructions to combine the performance data corresponding to the object with performance data of the different object from the plurality of physical objects.

* * * * *